Dec. 12, 1933. E. G. PEARSON 1,939,363
WASHER FOR WATER FAUCETS
Filed June 24, 1933
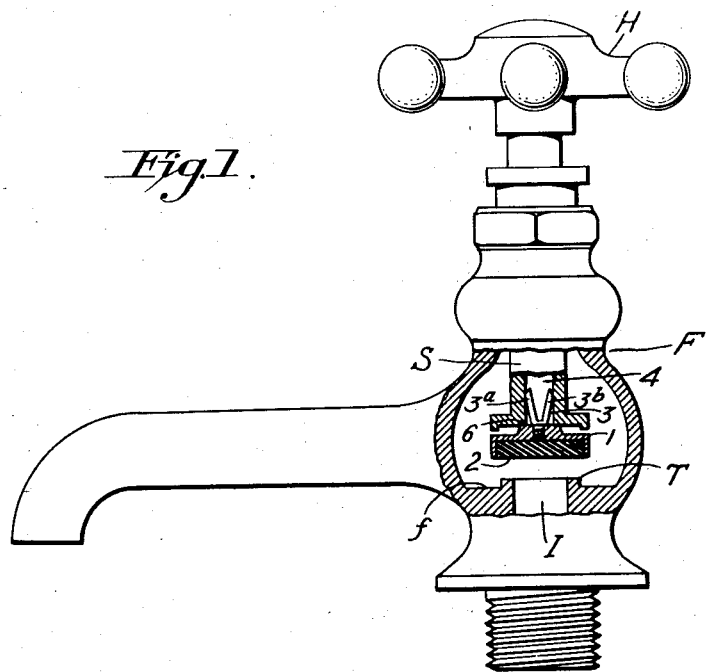
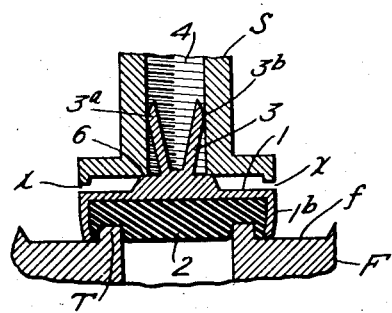
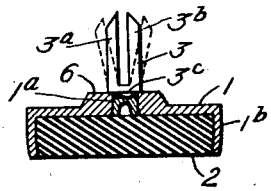
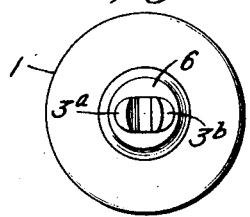
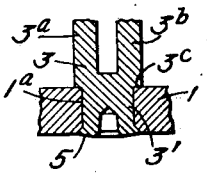
Inventor
Eric G. Pearson
By Attorneys
Nathan, Bowman + Helferich Patented Dec. 12, 1933

1,939,363

UNITED STATES PATENT OFFICE 1,939,363

WASHER FOR WATER FAUCETS

Eric G. Pearson, Roselle, N. J.

Application June 24, 1933. Serial No. 677,409

1 Claim. (Cl. 251—46)

This invention relates to compression valves or faucets and it has as its primary object to provide an improved washer therefor which readily may be attached to the usual valve stem without the use of screws or other attaching means.

Another object of the invention is to provide a washer of this nature which readily may be connected to the valve stem and which will be held thereon sufficiently securely to avoid all chattering when in use but which will be freely rotatable relative thereto, whereby the washer will, upon initial contact with the usual seat, remain stationary against rotation while the stem continues to be rotated, thereby to force the washer against said seat with a straight pressing action. This obviates all grinding and cutting action between the seat and the washer, which, in constructions in which the washer is fixedly secured to the stem, causes the washer soon to be destroyed.

A further object of this invention is to provide a readily replaceable washer of the type above described in which the stem of the washer frictionally engages the bore in the valve stem and in which there is a limited surface contact between the lower end of the stem and the washer, as distinguished from prior constructions having either a substantial surface contact or a line contact, both of which are objectionable.

Still another object is to provide an improved replacement washer in which an unbroken and imperforate gasket is enclosed within a metallic casing, which casing serves, by engagement with a portion of the faucet, to limit the movement of the washer, thereby to prevent the valve seat from being forced too deeply into the gasket.

A still further object of the invention is to provide an improved replacement washer which is simple in construction and which, therefore, may be manufactured and sold at a relatively low price.

Other objects and advantages will be in part indicated in the following description and in part rendered apparent therefrom in connection with the annexed drawing, in which:—

Figure 1 is a side elevation, partly in section, of a faucet, embodying the present invention.

Fig. 2 is an enlarged sectional view of a modified form of my improved washer showing it applied to a valve stem and engaging the usual valve seat of a faucet.

Fig. 3 is a plan view of the washer shown in Fig. 2.

Fig. 4 is a sectional view of a preferred form of my improved washer.

Fig. 5 is a detail perspective view of a gasket as embodied in my improved washer.

Fig. 6 is an enlarged sectional view showing more clearly the manner in which the retaining pin, in the preferred form, is secured in the casing which houses the gasket.

Referring more specifically to the drawing the invention is disclosed as embodied in a faucet F having the usual rotatable and endwise movable valve stem S threaded therein and adapted to be rotated by the hand wheel H. The faucet is also provided with a seat surrounding the inlet port I and adapted to be engaged by the gasket, later to be referred to. This seat is preferably raised from the body of the faucet as shown at T in Figs. 1 and 2.

My improved washer, which is a completely assembled unit, preferably comprises a cup-like casing member 1, an unbroken and imperforate gasket 2 secured therein, and a split attaching pin 3 projecting from one side of the casing and adapted to be inserted within the usual threaded bore 4 formed in the valve stem S. Preferably the pin 3 is formed as a separate element and has its reduced end 3' extended through an aperture 1ᵃ in the upper wall of the casing and riveted at the underside thereof, as shown at 5, in Fig. 6. This riveting of the pin may be effected by a single blow of a suitable punch during assembling, after which the upper wall of the casing member is securely held between the shoulder 3ᶜ and the riveted end 5. If desired the pin 3 and the casing 1 may be formed integral as shown in Fig. 2. The pin 3 is split and the legs 3ᵃ—3ᵇ thereof are spread apart, as shown in full lines in Figs. 1 and 2 and in dotted lines in Fig. 4, to a position wherein their outermost ends are spaced apart slightly greater than the diameter of the threaded bore 4 in the valve stem. The legs of the pin, being resilient, are compressed slightly as the pin is inserted in the bore of the valve stem. This resiliency produces sufficient friction between the legs 3ᵃ—3ᵇ and the wall of the bore 4 to hold the washer on the stem during normal handling of the latter.

Surrounding the pin 3, the casing is formed with a raised and flattended annular surface 6 adapted to be engaged by the underside of the stem S adjacent the bore. The area of this surface is relatively small and, therefore, the friction between the washer and the stem is overcome the instant the gasket 2 engages the seat in the faucet. Certain washers, heretofore provided, have had relatively large contact areas between the washer and stem while others have provided a line contact. It has been found that in the former the friction between the surfaces is so great that the washer tends to turn with the stem thereby producing the objectionable grinding action, whereas with the line contact, objectionable wear occurs in the parts at the line of contact. I have found, by experiment, that both of these objections may be overcome by the use of the relatively small flat annular surface, as shown herein.

The casing 1 is formed with an annular flange 1ᵇ, which is constricted slightly at its lower edge, thereby securely holding the imperforate gasket 2 therein. This flange is substantially co-extensive with the thickness of the gasket and, as shown in Fig. 2, is adapted to engage the upper horizontal surface f of the faucet F in the closed position thereof. This construction definitely limits the downward movement of the valve stem to a position in which an effective seal is obtained. From Fig. 2 it will be seen that this construction provides a metal to metal contact from the body of the faucet F, through the flange 1ᵇ and the surface 6, to the lower end of the valve stem. This prevents a careless user from so tightly closing the faucet as to injure the gasket, which it is to be understood is of relatively soft material and capable of receiving the seat T as shown in Fig. 2, without injury.

In certain faucets the lower end of the valve stem is perfectly flat, whereas in others there is an annular flange formed thereon. In applying my improved replacement washer to the latter type it may be necessary slightly to file off the flange to afford clearance therebetween and the casing 1, as indicated at x in Fig. 2. This insures contact between the stem and the surface 6 of the washer, which is desirable, as above described.

From the foregoing it will be perceived that I have provided an improved washer which quickly and easily may be applied to faucets without the use of tools or attaching means; which may be sold as unitary devices without danger of the parts becoming disassembled; and which is proof against destruction by careless operation of the faucet.

Having thus described my invention what I claim as new and desire to secure by Letters Patent of the United States, is:—

A washer for a water faucet of that type having an endwise movable stem provided with an axial bore and a raised annular seat coaxial with said stem, said washer comprising an annular cup-like casing having an aperture in one wall thereof; a pin having a reduced end fitted into said aperture and extending through said wall and having its inner end riveted within said casing thereby to secure the pin to the casing, the outwardly projecting portion of said pin being split and spread apart to a position in which the legs thereof are adapted to be frictionally held in said bore of the stem; an imperforate gasket within said casing completely covering the riveted end of said pin and adapted by endwise movement of said stem to be forced into contact with said seat thereby to close said faucet, said casing being constricted at its lower end to retain said gasket therein, said casing extending substantially to the lower edge of said gasket and being adapted to engage a portion of said faucet surrounding said seat thereby to limit the movement of said stem and washer toward said seat.

ERIC G. PEARSON.